United States Patent [19]

Weaver

[11] 4,320,204

[45] Mar. 16, 1982

[54] SINTERED HIGH DENSITY BORON CARBIDE

[75] Inventor: Gerald Q. Weaver, Princeton, Mass.

[73] Assignee: Norton Company, Worcester, Mass.

[21] Appl. No.: 237,831

[22] Filed: Feb. 25, 1981

[51] Int. Cl.³ .............................................. C04B 35/56
[52] U.S. Cl. ......................................... 501/91; 75/203; 75/236; 75/238
[58] Field of Search .................... 106/44; 75/203, 236, 75/238

[56] References Cited

U.S. PATENT DOCUMENTS

| | | | |
|---|---|---|---|
| 1,973,441 | 9/1934 | Moers et al. | 75/1 |
| 2,636,825 | 4/1953 | Nicholson | 106/44 |
| 3,666,507 | 5/1972 | Alper | 106/44 |
| 3,765,300 | 10/1973 | Taylor et al. | 106/44 |
| 3,836,673 | 9/1974 | Weaver | 106/44 |
| 4,081,284 | 3/1978 | Prochazka | 106/44 |
| 4,104,062 | 8/1978 | Weaver | 75/238 |

OTHER PUBLICATIONS

Lange et al.; "Sintering Kinetics of Pure and Doped Boron Carbide", Proceedings of the Fifth International Conference on Sintering and Related Phenomena, University of Notre Dame, South Bend, Ind., Jun. 18-20, 1979.

*Primary Examiner*—O. R. Vertiz
*Assistant Examiner*—Mark Bell
*Attorney, Agent, or Firm*—Arthur A. Loiselle, Jr.

[57] ABSTRACT

High density, sintered refractory articles composed of: 60 to 98% by weight of boron carbide and 2 to 40% by weight of silicon carbide, and 0 to 10% by weight of aluminum. As a result of the composition, products with densities in excess of 94% of theoretical can be produced by cold pressing followed by a pressureless heat treatment.

3 Claims, No Drawings

SINTERED HIGH DENSITY BORON CARBIDE

TECHNICAL FIELD

The invention relates to high density, high strength refractory compositions based on boron carbide. In addition, the invention is concerned with a method of pressureless sintering of such materials.

BACKGROUND ART

Prior Art Statement

The following publications are representative of the most relevant prior art known to the applicant at the time of filing the application: U.S. Pat. Nos.:
1,973,441, Sept. 11, 1934, K. Moers et al;
3,765,300, Oct. 16, 1973, K. M. Taylor et al;
4,081,284, Mar. 28, 1978, S. Prochazka;
4,104,062, Aug. 1, 1978, G. Q. Weaver.

Other Publications

Lange et al, "Sintering Kinetics of Pure and Doped Boron Carbide", proceedings of the Fifth International Conference on Sintering and Related Phenomena, University of Notre Dame, South Bend, Ind., June 18–20, 1979.

There are basically three methods of fabricating refractory articles of the type with which the instant invention is concerned, viz. hot-pressing where a refractory powdered is formed by the simultaneous application of heat and pressure; siliconizing where a green preformed refractory shape is heated and impregnated with silicon, the green shape usually containing carbon in some form; and, classical sintering, where a green refractory shape is first formed by pressing at room temperature, followed by a high temperature heat treatment at atmospheric pressure.

An example of the last method is taught by Moers et al in U.S. Pat. No. 1,973,441. According to Moers boron carbide containing one or more carbide e.g. silicon carbide and a metal such as nickel, cobalt, iron or chromium, is sintered, after preforming, at a temperature of about 2200° to 2300° C. The combination of powders is 75% boron carbide with the metal and the second carbide making up the remaining 25%. One of the formulations described produces a sintered product make up 87% boron carbide, 11% silicon carbide and 2% iron. No mention is made of the density of the final product. The present invention does not involve any of the metals taught by Moers but rather utilizes aluminum.

Another cold press-sintering process is taught by the Lange et al publication. Lange et al a mixture of 2 to 5 micron and 0.03 micron boron carbide powders and added various amounts of several different additives viz. aluminum fluoride, nickel, iron or copper. The boron carbide powder and additive were blended together, including a temporary binder. The molding powder was first pressed into pellets, recrushed, and then pressed into the desired samples, all the pressing being done at room temperature. The samples were then fired and sintered in argon at atmospheric pressure. The invention distinguishes over Lange et al in that the invention utilizes substantial quantities of silicon carbide and metallic aluminum whereas Lange et al uses neither.

Still a further example of prior art cold press-sintering is the Prochazka et al patent. According to this reference 70 to 90% silicon carbide is blended with 10 to 30% commercial grade boron carbide and a small amount of temporary binder. The mixture is molded into the desired shape and fired at 2200° C. in an inert atmosphere. The resulting sintered product has a density of at least 85% and can have a density as high as 99% of theoretical density. Very significantly, Prochazka et al make the statement in column 4 lines 66–68 that amounts of boron carbide greater than 30% by weight do not result in product with a density of at least 85%. By contrast, the present invention produces densities of 94% and higher with boron carbide levels of 60 to 98% by weight.

U.S. Pat. No. 4,104,062 as compared to the present invention is an example of the hot-pressing method of forming high density refractory shapes from boron carbide. Blends of 70 to 90% by weight of boron carbide and 3 to 30% by weight of aluminum (including a small amount of temporary organic binder) are first pressed to shape in a conventional steel mold at room temperature. The preformed shape is then placed in a graphite hot-press mold and pressed at 1800° to 2300° C. under a pressure of 500 to 1000 psi. The densities of the resulting shapes are from 2.5 to 2.54 g/cc. The applicant's present invention differs from that of this patent in that the present invention utilizes silicon carbide and the cold press-sintering method to produce extremely high density refractory shapes.

The so-called siliconizing process is exemplified by the Taylor et al patent. In this boron carbide powder, preferably containing a carbon containing temporary binders, is first formed into the desired shape by pressing, casting, or the like. The shape is then placed in contact with metallic silicon and heated to e.g. 1600° C. whereupon the silicon melts and impregnates the boron carbide shape. The heat also causes the temporary binder to coke. The silicon then reacts with the carbon to form silicon carbide. The resulting product is made up of from 50 to 80% boron carbide, 10 to 45% silicon carbide and from 3 to 35% free silicon. This type of product is not a truly sintered product as is the product of the present invention.

DISCLOSURE OF THE INVENTION

The invention is a boron carbide based refractory composition which is formed by cold pressing, followed by pressureless sintering, said sintered refractory composition having a density of at least 85% of theoretical and preferably a density of at least 94% of theoretical.

Covalently bonded inorganic compounds such as silicon nitride and the carbides of boron and silicon are very difficult to sinter without the simultaneous application of heat and pressure. Without proposing any theory, the present invention overcomes this problem by virtue of the inherent properties of this novel composition.

It has been found that when blends of from 60 to 98% by weight of boron carbide powder and 2 to 40% by weight of silicon carbide powder are cold molded and fired at around 2200° C., true sintering takes place and the body shrinks to a very high density, i.e. a density of at least 855 of theoretical and preferably at least 94% of theoretical. Various theories have been put forth to explain the densification of boron carbide containing additions of from 0.75 to 10% of aluminum fluoride, nickel, copper and iron (Lange et al cited above). According to Lange et al there may be several phenomena which play a role in the densification of covalently bonded solids such as silicon carbide and boron carbide when attempts are made to sinter each of these materials alone or in combination with various sintering aids. Densification allegedly involves grain boundary energy and point defect formation and migration. It is also proposed that the sintering of boron carbide involves two early stages, a middle stage, and a late stage, all involving different transport mechanisms. These theories may or may not apply to the present invention.

The compositional parameters of the invention are relatively broad as set forth above. However, a preferred composition is around 87% by weight of boron carbide, 10% by weight of silicon carbide, and 3% by weight of aluminum. Compositions in this latter category sinter, under the proper conditions, to a density of 2.41 g/cm$^3$ or higher, which corresponds to at least 94% of theoretical density.

If optimum density is to be attained, particle sizes of the constituent powders must be considered. Particle size distributions are selected which allow maximum compaction. This is well known to those skilled in the art and constitutes no part of the essence of the present invention. A very suitable particle size combination is an average particle size of approximately 9 microns for the boron carbide and approximately 2.5 microns for the silicon carbide. The aluminum is preferably added by milling the boron carbide in an aluminum mill using aluminum milling balls. However, the aluminum may be added as a powder and milled along with the other two powders in an inert milling medium such as isopropyl alcohol. The powder is then dried to remove the milling medium.

Once the powders are thoroughly mixed, a small amount of temporary binder is added to the mixture. Any of the conventional temporary binders are acceptable, such as e.g. 3% by weight of a 1% solution of methyl cellulose.

The powder containing the temporary binder is then loaded into a conventional steel mold setup and pressed at room temperature to as high a density as the equipment used will allow. Typically a pressure of from 3000 to 6000 psi is employed. To further densify the cold pressed shape, it is removed from the mold setup and isostatically pressed. The pressure isostatically applied may be as high as the equipment will withstand; a desirable pressure is 30,000 psi. Following the cold forming of article is then preferably dried to remove the solvent from the temporary binder; in the case of a methyl cellulose solution 70° C. is an effective drying temperature. To further densify and sinter the compact it is fired in a graphite induction furnace at from 1800° to 2300° C. To avoid chemical deterioration of the boron carbide and/or silicon carbide, the firing is carried out in an atmosphere that is relatively inert to these materials at temperatures in the range of 1800°–2300° C. A preferred firing environment is argon.

EXAMPLES OF THE PREFERRED EMBODIMENTS

EXAMPLE I 270 grams of boron carbide having an average particle size of approximately 9 microns, and 30 grams of silicon carbide having an average particle size of approximately 2.5 microns were placed in an aluminum lined ball mill loaded with 0.5 inch diameter aluminum balls and 500 cc of isopropyl alcohol was added to the milling jar. Both the milling jar and the balls were composed of high purity aluminum. The mixture was milled overnight, removed from the milling jar and dried at 70° C. for 16 hours. The mixture of boron carbide and silicon carbide had picked up 3% by weight of aluminum.

Approximately 3% by weight of a 1% methyl cellulose solution was blended into the mixture of powders to function as a temporary binder. Four pieces measuring 2"×2"×⅜" were pressed in a steel mold setup at pressures of from 3000 to 6000 psi. Immediately thereafter the pieces were isostatically pressed at 30,000 psi after which they were dried overnight at 70° C. They were then fired in a conventional graphite induction furnace in an argon atmosphere at a temperature of 2150° C. The resulting pieces showed a weight loss of 2 to 3% and a linear shrinkage of 10 to 14%. The fired densities ranged from 2.40 to 2.42 g/cm$^3$ or approximately 94% of theoretical.

EXAMPLE II 210 grams of boron carbide having an average particle size of approximately 9 microns and 90 grams of silicon carbide with an average particle size of 2.5 microns were placed into a tungsten carbide ball mill loaded with tungsten carbide milling balls and 500 cc of isopropyl alcohol was added to the milling jar. The mixture was milled overnight, removed from the milling jar and dried at 70° C. for 16 hours. The mixture of boron carbide and silicon carbide had picked up a small undetermined amount of tungsten carbide.

Approximately 3% by weight of a 1% methyl cellulose solution was added to the mixture of powders to function as a temporary binder. Several bars measuring 2"×2"×⅜" were pressed as in Example I and dried overnight at 70° C. They were then fired in a graphite induction furnace in argon at 0.5 atmosphere to a temperature of 2050° C. with a 10 minute soak at that temperature. The resulting pieces exhibited a linear shrinkage of about 6% and had a density of approximately 2.4 g/cc.

What is claimed is:

1. A sintered high density wear resistant refractory composition consisting of from 60 to 98% by weight of boron carbide, 2 to 40% by weight of silicon carbide, and 0 to 10% by weight of aluminum, said refractory composition having a density of at least 85% of theoretical density.

2. The refractory composition of claim 1, wherein the density of said refractory composition is at least 94% of theoretical density.

3. The sintered high density wear resistant refractory composition of claim 1 consisting of about 87% by weight of boron carbide, about 10% of weight of silicon carbide, and about 3% by weight of aluminum, said composition having a density of approximately 2.41 g/cm$^3$.

* * * * *

UNITED STATES PATENT AND TRADEMARK OFFICE
CERTIFICATE OF CORRECTION

PATENT NO. : 4,320,204
DATED : March 16, 1982
INVENTOR(S) : Gerald Q. Weaver

It is certified that error appears in the above—identified patent and that said Letters Patent is hereby corrected as shown below:

Column 1, line 45, "make" should read -- made --.

Column 2, line 29, after "this" should read -- method --.

Column 2, line 61, "855" should read -- 85% --.

Column 3, line 26, after "carbide" should read -- and silicon carbide --.

Column 4, line 43, "2.4" should read -- 2.44 --.

Signed and Sealed this

Eighteenth Day of May 1982

[SEAL]

Attest:

Attesting Officer

GERALD J. MOSSINGHOFF
Commissioner of Patents and Trademarks